(12) United States Patent
Hu et al.

(10) Patent No.: US 8,488,849 B2
(45) Date of Patent: Jul. 16, 2013

(54) IMAGE RECONSTRUCTION USING DATA ORDERING

(75) Inventors: Zhiqiang Hu, Twinsburg, OH (US); Wenli Wang, Aurora, OH (US); Daniel Gagnon, Twinsburg, OH (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 694 days.

(21) Appl. No.: 12/279,848

(22) PCT Filed: Feb. 5, 2007

(86) PCT No.: PCT/US2007/061595
§ 371 (c)(1),
(2), (4) Date: Jul. 13, 2010

(87) PCT Pub. No.: WO2007/100954
PCT Pub. Date: Sep. 7, 2007

(65) Prior Publication Data
US 2010/0272335 A1    Oct. 28, 2010

Related U.S. Application Data

(60) Provisional application No. 60/766,960, filed on Feb. 22, 2006.

(51) Int. Cl.
*G06K 9/00* (2006.01)

(52) U.S. Cl.
USPC .......................................................... 382/128

(58) Field of Classification Search
USPC .......................................................... 382/128
See application file for complete search history.

(56) References Cited

U.S. PATENT DOCUMENTS

| | | |
|---|---|---|
| 2001/0040219 A1 | 11/2001 | Cherry et al. |
| 2004/0252870 A1 | 12/2004 | Reeves et al. |

FOREIGN PATENT DOCUMENTS

| | | |
|---|---|---|
| EP | 0373854 A2 | 6/1990 |

OTHER PUBLICATIONS

Johnson, C. A., et al.; A System for the 3D Reconstruction of Retracted-Septa PET Data Using the EM Algorithm; 1994; IEEE-Nuclear Science Symposium and Medical Imaging Conf.; vol. 3:1325-1329.*

De La Prieta, R.; An Accurate and Parallelizable Geometric Projector/Backprojector for 3D PET Image Reconstruction; 2004; Lecture Notes in Computer Science Online; vol. 3337/2004:27-38.

Desjardins, B., et al.; Parallel Approach to Iterative Tomographic Reconstruction for High Resolution PET Imaging; 1997; IEEE-Nuclear Science Symposium; vol. 2:1551-1555.

(Continued)

*Primary Examiner* — Michael Fuelling

(57) ABSTRACT

Methods, systems and apparatuses for processing data associated with nuclear medical imaging techniques are provided. Data is ordered in LUT's and memory structures. Articles of manufacture are provided for causing computers to carry out aspects of the invention. Data elements are ordered into a plurality of ordered data groups according to a spatial index order, and fetched and processed in the spatial index order. The data elements include sensitivity matrix elements, PET annihilation event data, and system and image matrix elements, the data grouped in orders corresponding to their processing. In one aspect geometric symmetry of a PET scanner FOV is used in ordering the data and processing. In one aspect a system matrix LUT comprises total number of system matrix elements equal to a total number of image matrix elements divided by a total number of possible third index values.

12 Claims, 6 Drawing Sheets

OTHER PUBLICATIONS

Ma, T., et al.; Efficient Analytical Scatter Modeling in Fully 3-D Iterative Single Photon Emission Computed Tomography Reconstruction; 2003; IEEE-Nuclear Science Symposium Conf. Record; vol. 5:3137-3141.

Motta, A., et al.; Fast 3D-EM reconstruction using Planograms for stationary planar positron emission mammography camera; 2005; Computerized Medical Imaging and Graphics; 29:587-596.

Worstell, W. A., et al.; Compact Representation of PET 3D System Response Matrices; 2004; IEEE Biomedical Imaging; pp. 756-759.

Matej, S., et al.; Efficient 3D Grids for Image Reconstruction Using Spherically-Symmetric Volume Elements; 1995; IEEE Trans. on Nuclear Science; 42(4)1361-1370.

Qi, J., et al.; Fully 3D Bayesian Image Reconstruction for the ECAT EXACT HR+1; 1998; IEEE Trans. on Nuclear Science; 45(3)1096-1103.

Qi, J., et al.; Propagation of Errors from the Sensitivity Image in List Mode Reconstruction; 2004; IEEE Trans. on Medical Imaging; 23(9)1094-1099.

* cited by examiner

IMAGE RECONSTRUCTION USING DATA ORDERING

CROSS REFERENCE TO RELATED APPLICATIONS

This application claims the benefit of U.S. provisional application Ser. No. 60/766,960 filed Feb. 22, 2006, which is incorporated herein by reference.

The present invention relates to the field of positron imaging, and more particularly to the use of data ordering in the reconstruction of annihilation event data acquired in positron emission tomography (PET). Data ordering applications include the design and implementation of lookup tables (LUT's); on-the-fly reconstruction calculations in non-LUT reconstruction methods; list mode data ordering; and sensitivity matrix calculations.

Positron emission tomography (PET) is a branch of nuclear medicine in which a positron-emitting radiopharmaceutical such as $^{18}$F-fluorodeoxyglucose (FDG) is introduced into the body of a patient. As the radiopharmaceutical decays, positrons are generated. More specifically, each of a plurality of positrons reacts with an electron in what is known as a positron annihilation event, thereby generating a coincident pair of 511 keV gamma rays which travel in opposite directions along a line of response (LOR).

A PET scanner is used to detect the positron annihilation events and generate an image of at least portions of the patient from a plurality of detected annihilation events. During a patient scan hundreds of million of events are typically detected and recorded. The observed events may be sorted and organized with respect to each of a plurality of projection rays, wherein all events occurring along each projection ray are organized into a two-dimensional sinogram array; the array typically stored in a computer-readable memory media. The observed events may also be stored in a list mode.

The annihilation event data is used to reconstruct volumetric data indicative of the distribution of the radionuclide in the object. Reconstruction is typically performed using statistical (iterative) or analytical reconstruction algorithms. Iterative methods can provide a superior reconstruction relative to analytical reconstruction methods. However, they are as a rule more complex, computationally more expensive, and relatively more time consuming. Iterative reconstruction techniques include the maximum likelihood expectation maximization (ML-EM), ordered subsets expectation maximization (OS-EM), resealed block iterative expectation maximization (RBI-EM), and row action maximization likelihood (RAMLA) techniques.

In iterative reconstruction a three-dimensional (3D) image matrix of discrete image elements is defined in a volumetric image space. The iterative reconstruction can be characterized as involving three basic steps: first, starting with an initial object estimate defined by the three-dimensional image matrix elements, an object estimate is forward projected into the projection domain; second, the resulting projections are compared against the measured projections to form corrections in the projection domain; and third, the corrections are then backprojected into the image domain and used to update object estimate system matrix elements. The three basic steps thus described are repeated through additional iterations until the estimate converges to a solution or the iteration process is otherwise terminated.

Reconstruction time can be a key factor in the performance of iterative reconstruction techniques. Calculation of the system matrix is a very time-consuming task, and accordingly optimizing system matrix computation may provide reconstruction time efficiencies. One technique provides for the calculation of the system matrix in advance of the iterative reconstruction. Such a pre-calculated system matrix may be saved as a disk file, typically as a lookup table (LUT), and during reconstruction the LUT is loaded into a computer system memory for access as needed. As is well known in the art of computer design, a LUT is generally an array or matrix of data that contains items that are searched. In one technique LUT's may be arranged as key-value pairs, where the keys are the data items being searched (looked up) and the values are either the actual data or pointers to where the data are located. In other techniques, LUT's contain only data items (just values, not key-value pairs).

Although pre-calculation of the system matrix may provide for time efficiencies over on-the-fly system matrix determination, memory size and memory access bandwidth issues have limited the use of LUT's in iterative reconstruction. System matrices are generally large and require significant memory resources: accordingly, LUT size may be limited by the size of the physical memory available. Moreover, even if a large LUT may be accommodated by system memory resources, accessing the LUT from memory may require significant time: in one example, 100 clock cycles may be required to fetch one system matrix element from a LUT in memory for an operation. Accordingly, accessing large LUT's and/or large system matrix elements from memory requires a correspondingly large memory access time. As a result, memory access times alone may exceed the times required for on-the-fly system matrix determination, thereby nullifying LUT pre-calculation time advantages.

What is needed is method and system that provides for time-efficient design and application of LUT's in iterative reconstruction techniques.

In one aspect a method for processing data associated with a nuclear medical imaging technique is provided. Data elements are ordered into a plurality of ordered data groups according to a spatial index order, wherein each of the plurality of ordered data groups has a plurality of data elements each with common first and second index values and a divergent third index value. An ordered data group is fetched into a memory device and processed in the spatial index order.

In another aspect the data elements are sensitivity matrix elements, and ordering the data elements comprises ordering the sensitivity matrix elements in a symmetrical memory access pattern.

In another aspect the method for processing data is a method for reconstruction of PET data into a volumetric image, and processing each data element comprises generating an image estimate update. In one aspect the method for reconstruction of PET data is a list mode technique, and parallel annihilation events are grouped in an order corresponding to an iterative reconstruction processing order of list mode data.

In another aspect ordering the data groups comprises using a geometric symmetry of a PET scanner FOV. In one aspect the data groups are ordered according to an axial spacing dimension of PET scanner detector crystals.

In another aspect a system matrix element is fetched from an ordered LUT into a memory device, the ordered LUT comprising a plurality of system matrix elements ordered in correlation to the spatial index order, wherein the data elements are each ordered image matrix elements, and the system matrix element is used to update each of the image matrix elements. In one aspect the system matrix element is used to update each image matrix element having first and second index values common with the system matrix element. In another aspect the LUT comprises a total number of system matrix elements equal to a total number of image matrix elements divided by a total number of possible third index values.

In another aspect the ordered data group is fetched into a cache, and image matrix elements in the cache are updated with the system matrix element in an ascending or descending axial index order common with their order in memory. In one aspect an image estimate update order comprises looping on system matrix element indices and image matrix element indices, wherein beginning with an innermost loop of an image element axial index, image matrix elements intersecting an indicated LOR azimuthal angle value are selected by incrementing a system matrix LOR axial index together with an image matrix element axial index. In one aspect a second system matrix element having a second LOR index, and a second ordered image matrix group chosen in correlation with the indexed second LOR index, are fetched into the cache and each of the second ordered image matrix group updated with the second system matrix element.

In another aspect a system is provided, comprising a memory containing an ordered LUT comprising a plurality of data elements ordered relative to a geometric index in a spatial index order and a processor, wherein the processor is configured to fetch each of a plurality of data elements from the LUT and process each of the plurality of data elements in the spatial index order. In one aspect the plurality of data elements is a plurality of system matrix elements, the processor is a reconstructor, and the reconstructor is configured to fetch each of a plurality of system matrix elements from the LUT and generate volumetric data responsive to data indicative of emission events in an object under examination by processing each of an ordered group of image matrix elements with the system matrix element in an image matrix update order, the image matrix update order common with an order of storage of the image matrix elements in the memory. In one aspect the LUT comprises a total number of system matrix elements, the total number of system matrix elements equal to a total number of image matrix elements divided by a total number of possible geometric index values. In another aspect the reconstructor is configured to loop sequentially through all azimuthal angle value indices of the system matrix elements. In another aspect the system further comprises an array of PET detector means spaced along an axial PET scanner axis for obtaining the data indicative of emission events in an object under examination, wherein the ordered system element matrix LUT and the ordered image element matrix are ordered in common with the axially spaced array; and means for generating a human readable image indicative of the corrected data.

In another aspect a LUT is provided comprising a plurality of system matrix elements ordered in alignment with a PET scanner detector crystal spacing along an axial axis. In one aspect the LUT comprises a total number of system matrix data elements, the total number a function of a number of radial data bins; a number of LOR azimuthal angles; and a number of PET scanner axial detector rings. In another aspect the LUT has a total number of system matrix elements equal to a total number of image matrix elements divided by a total number of possible axial axis index values. In another aspect the LUT is configured for use in reconstruction of PET data into a volumetric image by a reconstructor, wherein the reconstructor is configured to fetch a system matrix element having a first and second index value from the LUT into a cache and generate an image estimate update by updating each of a plurality of image matrix elements fetched into the cache with the system matrix element, each of the plurality of image matrix elements having the first and second index values and divergent axial axis index values.

In another aspect an LUT is provided comprising a plurality of data elements ordered in correlation to the processing of the data elements by a processor, wherein a first LUT data element fetched into a memory device for a first plurality of sequentially ordered data element operations by the processor is located in the LUT next to a second LUT data element fetched for an immediately subsequent second plurality of sequentially ordered data element operations. In another the processor is a PET scanner reconstructor and the plurality of data elements is a plurality of system matrix elements ordered in correlation to the processing of the system matrix elements by the reconstructor. First and second pluralities of sequentially ordered data element operations comprise generating volumetric data responsive to data indicative of emission events in an object under examination by processing a first ordered group of image matrix elements with the first system matrix element in an image matrix update order, the image matrix update order common with an order of storage of the first ordered group of image matrix elements in the memory, and processing a second ordered group of image matrix elements with the second system matrix element in the image matrix update order, the image matrix update order common with an order of storage of the second ordered group of image matrix elements in the memory. In one aspect the LUT comprises a total number of system matrix elements, the total number of system matrix elements equal to a total number of image matrix elements divided by a total number of possible values of an image matrix axial index.

In another aspect a positron imaging apparatus is provided, comprising an array of detector means spaced along an axial scanner axis for obtaining data indicative of emission events in an object under examination; a memory containing a LUT comprising a plurality of system matrix elements ordered in correlation with the axially spaced array; a reconstructor means for reconstructing the obtained data to generate volumetric data by using the system matrix elements; and means for generating a human readable image indicative of the corrected data. In one aspect a cache is provided, the reconstructor means configured to fetch a system element with a first index value and a second index value from the LUT, and a plurality of image matrix elements, each of the plurality of image matrix elements having the first and second index value in common and divergent third index values, into the cache; and update the fetched plurality of image matrix elements with the fetched system matrix element.

In another aspect an article of manufacture is provided comprising a computer usable medium having a computer readable program embodied in said medium, wherein the computer readable program, when executed on a computer, causes the computer to fetch an ordered data group into a memory device, the ordered data group comprising an ordered plurality of data elements ordered having common first and second index values and a divergent third index value; and process each data element of the ordered data group from the memory device in a processing order, the processing order comprising the order of the plurality of data elements in the ordered data group.

In one aspect the article of manufacture causes the computer to generate an image estimate update by processing each data element of the ordered data group from the memory device in the processing order. In another aspect the article of manufacture causes the computer to order the ordered data group by using a geometric symmetry of a PET scanner FOV (108). In another aspect the article of manufacture causes the computer to order the ordered data group according to an axial spacing dimension of PET scanner detector crystals.

In another aspect the article of manufacture causes the computer to fetch the ordered data group of image matrix elements having the same transverse indices but different axial indices into a cache memory device from a system memory resource; and process the system matrix elements in the ascending or descending axial index order.

Figure 1:
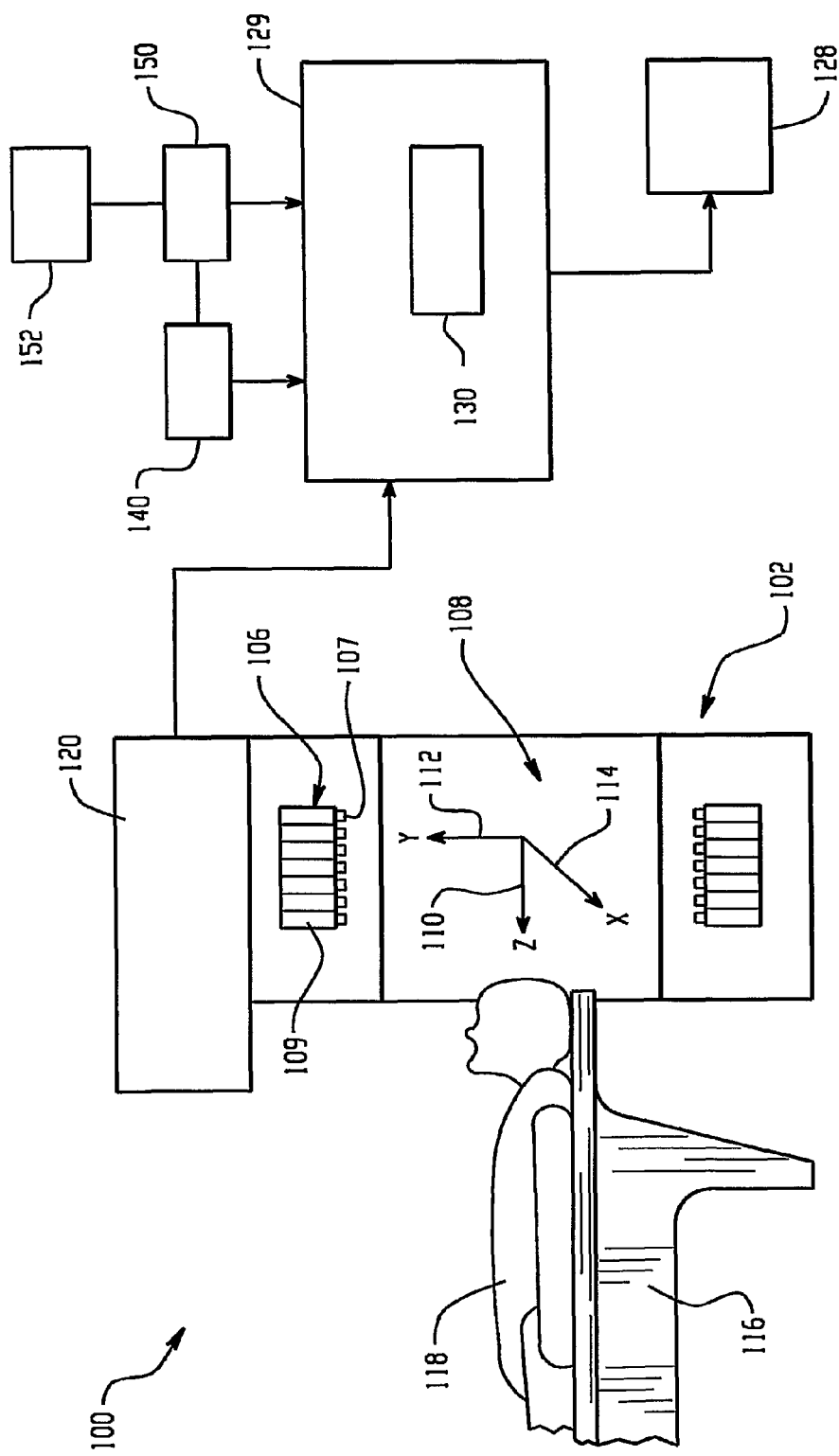
FIG. 1 depicts a PET system.

With reference to FIG. 1, a PET system 100 includes a ring PET gantry portion 102. The PET gantry portion 102 includes one or more axial rings of radiation sensitive PET detectors 106 which surround an examination region 108. The detectors 106 comprise scintillator crystals 107 that convert the energy of each 511 KeV gamma ray characteristic of a positron annihilation event occurring within the PET examination region 108 into a flash of light that is sensed by a photomultiplier tube (PMT) 109. The field of view (FOV) of the detectors 106 may be defined in three-dimensions by the axial z axis 110 and by a transverse plane dimension defined normal to the axial z axis 110 and comprising a transverse horizontal axis x 114 and a transverse y axis 112, they axis 112 normal to the x 114.

The PET gantry portion 102 is preferably located in proximity with the examination region 108 and disposed along the common axial z axis 110. An object support 116 supports an object to be imaged 118 such as human patient. The object support 116 is preferably movable relative to the z axis 110 in coordination with operation of the PET system 100 so that the object 118 can be scanned at a plurality of axial locations by the PET gantry portion 102.

A PET data acquisition system 120 provides event data from a scan of the object 118 to a PET reconstructor 129. The event data may constitute list mode data comprising a list of annihilation events detected by the detectors 106, and includes information on the LOR for each event, such as a transverse and longitudinal position of the LOR, its transverse and azimuthal angles, and TOP information. Alternately, the event data may be rebinned into one or more sinogram or projection bins.

A PET reconstructor 129 includes at least one computer or computer processor 130. Generally speaking, the use of additional or more powerful processors will improve reconstruction speed. The reconstructor 129 uses an iterative technique to generate volumetric image data indicative of the distribution of the radionuclide in the object 118. Suitable techniques include ML-EM, OS-EM, RBI-EM, and RAMLA, although other techniques may be implemented.

Computer readable instructions which cause the processor 130 to carry out the reconstruction are preferably carried on one or more computer readable media 140 such as computer disks, volatile or non-volatile memory, or the like, and may also be transmitted by way of a suitable communications network such as the internet to storage media 140 accessible to the processor(s) 130. A workstation computer serves as an operator console 128 and includes a human readable output device such as a monitor or display and input devices such as a keyboard and mouse.

Figure 2:
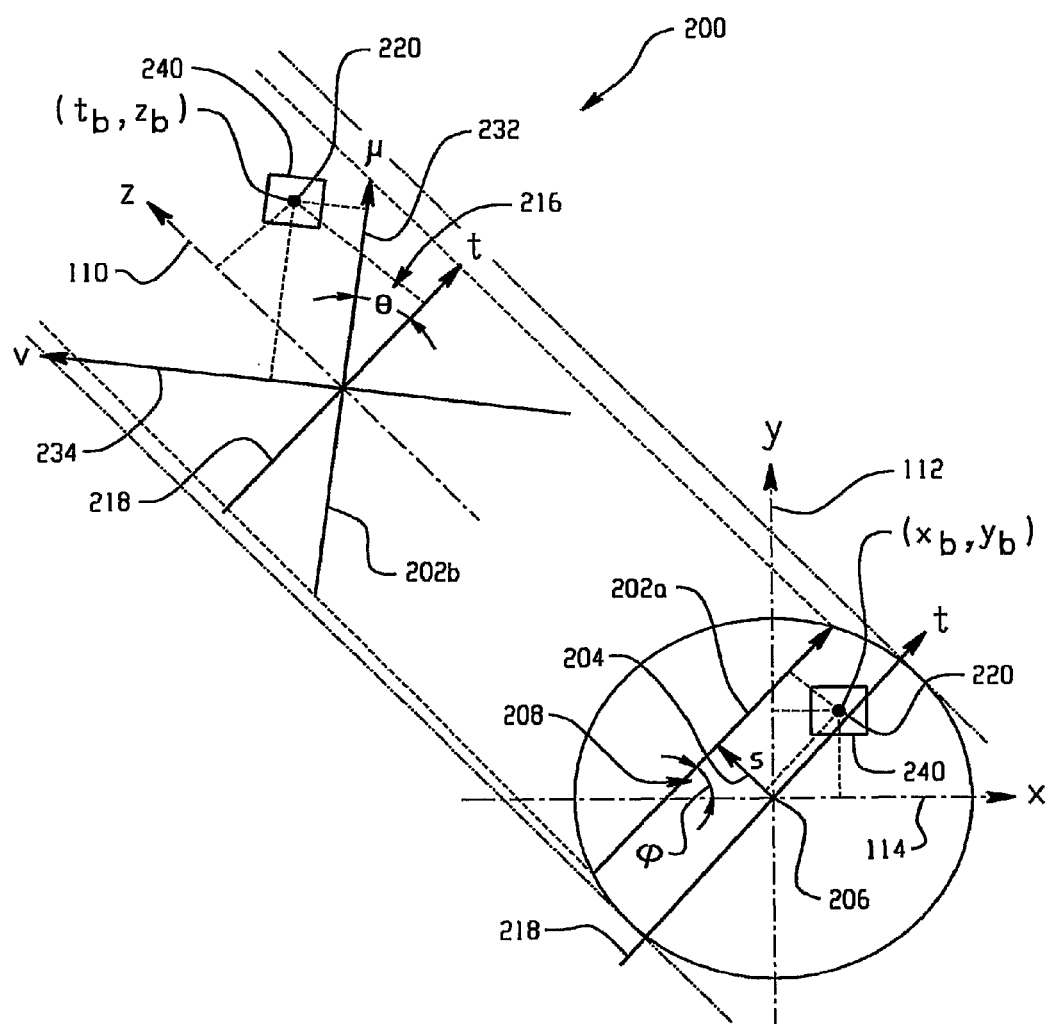
FIG. 2 is a graphical illustration of an annihilation event LOR within an image matrix.

Referring now to FIG. 2, an annihilation event LOR reported by the PET data acquisition system 120 may be described with respect to the center 220 of an image matrix element 240. LOR 202a is illustrated in relation to the image matrix element center 220 as defined with respect to the x axis 114 and y axis 112 of FIG. 1, wherein x axis 114 and y axis 112 define transverse plane axes normal to each other and to the z axis 110 located at the center of the PET scanner 100, a positive z axis 110 direction defined as pointing towards the back of the scanner 100. LOR 202b is a transform of 202a aligned with μ axis 232, LOR 202b and the μ axis 232 normal to the v axis 234, and wherein at axis 218 is defined as normal to the z axis 110, the μ axis 232 and v axis 234 defining a first coordinate pair and the t axis 218 and the z axis 110 defining a second coordinate pair, the first and second coordinate pairs rotated by angle θ 216 from the three-dimensional coordinate system defined by x axis 114, y axis 112 and z axis 110. More particularly, angle θ 216 is a tilt angle between LOR 202b and the t axis 218. Accordingly, the center 220 of the image matrix element 240 may be defined as $(x_b, y_b, z_b, t_b)$.

Figure 3:
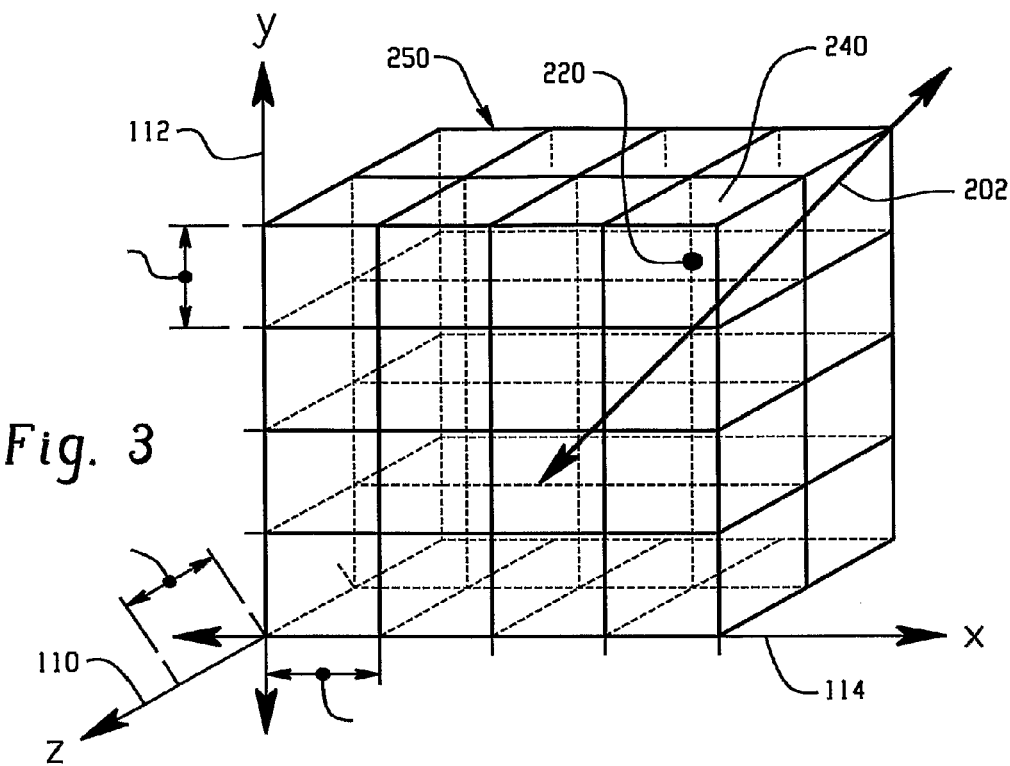
FIG. 3 is a perspective illustration of an annihilation event LOR within an image matrix.

Referring now to FIG. 3, a volumetric image matrix 250 may be defined by a plurality of discrete 3D image matrix elements 240. Examples of image elements 240 include blob and voxels, although other matrix basis elements may be provided. The image matrix elements 240 may be defined with respect to integer values, wherein i is an integer along the x axis 114, j is an integer along they axis 112 and k is an integer along the z axis 110.

In iterative reconstruction techniques a system matrix is calculated, wherein a plurality of system matrix elements each represent a possibility of a specific PET scanner detector 106 pair detecting a gamma ray pair emission from a positron annihilation event with respect to a specific volume element 240 in image space, the possibility represented by a matrix element value or weight. A system matrix element value is affected by a number of factors, illustratively including geometric factors, attenuation, the PET scanner 100's point spread function, inter-crystal penetration, and annihilation event time-of-flight (TOF) information. As discussed generally above, during reconstruction annihilation data is used to update individual image matrix elements 240 through each of a series of iterations until a final image estimate is derived, wherein a human-readable image may be generated from an updated image element matrix 250.

As also discussed generally above, calculation of the system matrix can be a very time-consuming task. More particularly, the size S of a system matrix may be defined as:

$$S = M * N;  \qquad \text{Equation 1}$$

wherein M is the number of LOR's 202 and N is the number of image matrix elements 240. Although reconstruction times may be reduced by calculating the system matrix as a LUT file in advance, memory size and memory access bandwidth issues limit the use of LUT's in iterative reconstruction. More specifically, a LUT large enough to define the entire system matrix may not be loaded into a computer system memory for access during reconstruction in a time efficient manner. In one illustrative example an image matrix 250 comprises a total number N of image elements 240 of about 1 million, and a total number M of LOR's 202 for the image matrix 250 is about 100 million, resulting in a system matrix size S of about $10^{14}$. Accordingly, geometric symmetry may be utilized to design and implement an efficient LUT having a size less than the entire system matrix.

The location of an LOR 202 with respect to the image element 240 center 220 ($x_b$, $y_b$, $z_b$, $t_b$) may be defined by four floating-point parameters s, φ, θ, z, wherein s is the distance 204 between an LOR 202 and a PET scanner FOV center 206 in a transverse plane; and φ is the angle 208 between the LOR 202 and the horizontal axis x 114 in the transverse x axis 114-y axis 112 plane. If a first LOR 202 doesn't intersect with a first matrix element 220, then the geometric factor of the first matrix element 220 with respect to the first LOR 202 is zero, and their product may be omitted from the system matrix and the LUT.

In one aspect, for an image matrix 250 defined by image basis function blobs 240, the geometric factor of a matrix element center 220 with respect to a LOR 202 is proportional to the distanced of the matrix element 220 center ($x_b$, $y_b$, $z_b$) from the LOR 202, which may be determined as follows. A distance relative to the transverse plane between the matrix element 220 and the LOR 202 may be calculated using the following:

$$\text{abs}(s - y_b \cos\phi + x_b \sin\phi) \qquad \text{Equation 2}$$

With respect to a side view perpendicular to both the LOR 220 and the axial axis z 110, a distance between the matrix element 220 and the LOR 202 may be calculated using the following:

$$\text{abs}((z_b - z)\cos\theta - (x_b \cos\phi + y_b \sin\phi)\sin\theta) \qquad \text{Equation 3}$$

Accordingly, a three-dimensional distance d between the matrix element 220 and the LOR 202 may be expressed as:

$$d = \sqrt{((s - y_b \cos\phi + x_b \sin\phi)^2 + ((z_b - z)\cos\theta - (x_b \cos\phi + y_b \sin\phi)\sin\theta)^2)} \qquad \text{Equation 4}$$

The image matrix 250 may be defined with symmetry about the x 114 and y 112 axes. As shown in the following Table 1, where LOR 202 is listed in Section 0, seven other LORs may intersect with an image matrix element 240 that have the same distance d as determined by Equation 4 relative to the matrix element center at ($x_b$, $y_b$, $z_b$).

TABLE 1

| Section | LOR | Intersecting matrix element |
|---|---|---|
| 0 | (s, φ, θ, z) | ($x_b$, $y_b$, $z_b$) |
| 1 | (−s, π/2 − φ, θ, z) | ($y_b$, $x_b$, $z_b$) |
| 2 | (s, π/2 + φ, θ, z) | (−$y_b$, $x_b$, $z_b$) |
| 3 | (−s, π − φ, θ, z) | (−$x_b$, $y_b$, $z_b$) |
| 4 | (−s, φ, −θ, z) | (−$x_b$, −$y_b$, $z_b$) |
| 5 | (s, π/2 − φ, −θ, z) | (−$y_b$, −$x_b$, $z_b$) |
| 6 | (−s, π/2 + φ, −θ, z) | ($y_b$, −$x_b$, $z_b$) |
| 7 | (s, π − φ, −θ, z) | ($x_b$, −$y_b$, $z_b$) |

Thus the distance d between the matrix element 240 and each of the LOR's represented by sections 0 through 7 of Table 1 may be determined from any one of the LOR's: if the intersection characteristics, and in particular the distance d of an LOR in one section is known, then the same intersection characteristics are used for each of the other seven section LORs. Accordingly, a LUT need only contain information with respect to one of the sections 0 through 7: this provides for a reduction in the size of the LUT by a factor of eight.

Figure 4:
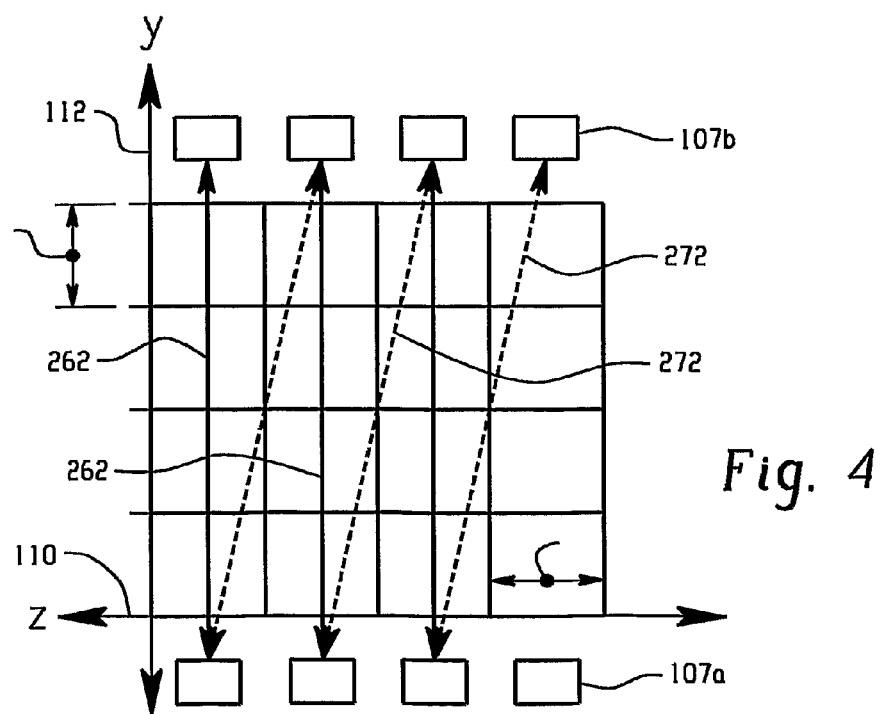
FIG. 4 is a side-view illustration of an annihilation event LOR within an image matrix.

Referring now to FIG. 4, in one aspect, geometric symmetry and a corresponding LUT size reduction may be gained by configuring the image matrix element grid 250 in alignment with detector crystal 107 spacing along the axial axis z 110. This enables the provision of only one z axial coordinate location in the LUT for each detector crystal 107 ring difference. Accordingly, the total number of $\text{LORs}_{TOTAL}$ incorporated in the LUT may be reduced by about two orders of magnitude, as determined by the following:

$$\text{LOR}_{TOTAL} = n_R * (n_\phi/4 + 1) * n_{rings}; \qquad \text{Equation 5}$$

wherein $n_R$ is the number of radial bins; $n_\phi$ is the number of azimuthal angles; and $n_{rings}$ is the number of axial rings.

In another aspect an LUT file may be organized and/or accessed with respect to LOR parameters. Referring again to FIG. 4, in one embodiment the z-axis 110 coordinate integers k of the LOR's 262 and 272 are equivalent to detector axial ring spacing. The LOR's 262 are parallel to each other and normal to the z axis 110, and have the same total number as the total number of axial ring crystal pairs detecting the LOR's 262. Therefore, in one PET scanner 100 example having 29 axial detector crystal rings, a system matrix element may be calculated once for one of the LOR's 262, stored in an LUT and used 28 more times for each of the rest of the LOR's 262, thus affording a 28-fold reduction in system matrix elements that must be calculated and stored in the LUT.

The LOR's 272 are also parallel to each other, and each detected by a first detector crystal 107a in a crystal ring having a k coordinate=n, and by a second detector crystal 107b in an adjacent crystal ring having a k coordinate=n+1. The LOR's 272 have a total number one less than the total number of axial ring crystal pairs detecting the LOR's 262. Therefore, in a PET scanner 100 example having 29 axial detector crystal rings, a system matrix element may be calculated once for one of the LOR's 272, stored in an LUT and used 27 more times for each of the rest of the LOR's 272, thus affording a 27-fold reduction in system matrix elements that must be calculated and stored in the LUT.

Implementing a LUT in a ray-driven projection process in an iterative reconstruction generally comprises selecting an LOR; identifying all volumetric grid matrix elements intersecting the LOR; and accumulating the products of grid matrix element values and LUT weights for all matrix elements intersecting the LOR. In another aspect, where the LUT is organized with the ray-driven symmetry described above, LUT matrix element weights can be retrieved directly from the LUT for LORs in one section (for example for a first LOR 262), and the weights transferred according to the symmetries discussed above for LORs in other sections not included in the LUT (therefore a remainder of the LOR's 262).

In one example each LOR under consideration is identified by a preceding one-word header in the LUT which points to the location of data associated with the LOR. All image matrix elements intersecting the LOR are also grouped: this is accomplished by providing a one-word header within the LOR data which indicates the number of matrix elements intersecting with an LOR, followed by the weight values for each of the intersecting matrix elements. In one example each matrix element intersecting an LOR is represented by one 4-byte word, wherein the first 3 bytes of each word indicates a matrix element's index in the matrix and the last byte provides a geometric factor. In one aspect the geometric factor may also be scaled to provide improved precision.

In another aspect the LUT file may be organized so that only those portions required for a given reconstruction process are loaded into memory, avoiding the need to load the whole LUT into memory at one time during reconstruction. For example, it is known to use event data subsets in iterative reconstruction techniques to accelerate the image estimate convergence, wherein each data subset is a fraction of total event data in LOR space. Accordingly, in one aspect the LUT file is organized in a manner correlating to the derivation of the data subsets, and during reconstruction processing of a first subset only those LUT LOR's already grouped together in a subset association are loaded into memory. In one example where LOR azimuthal angle data is used to divide the event data into data subsets, all LORs with the same azimuthal angles are grouped together in the LUT for loading into memory as a subset group. This type of LUT organization may be utilized wherever geometrically ordered data subsets are used, including both histogram and list mode data reconstruction techniques.

In another aspect LUT organization and access is configured to maximize the use of fast system memory resources. Generally, a significant portion of processing time in an iterative reconstruction is spent on retrieving LUT data from system memory 140 to the reconstruction processor 130, and therefore providing faster data retrieval from memory will reduce overall reconstruction times. It is known in computer system design to provide cache memory 150 in addition to conventional memory 140. Cache memory provides significantly faster data access relative to conventional memory. In a conventional reconstruction application utilizing cache, a processor requiring matrix element data for an instruction execution will first check to see if the data is available in the cache: if the data is in the cache (a cache hit), the data is moved to the processor from the cache; if the data is not in the cache (a cache miss), then the data must be loaded from a conventional memory. In one example a LUT matrix element may be moved from a cache to a processor in a few clock cycles, wherein moving the same matrix element from a conventional system memory to the processor 130 will take hundreds of clock cycles. Thus accessing LUT data from a cache is preferred over conventional memory access.

Figure 5:
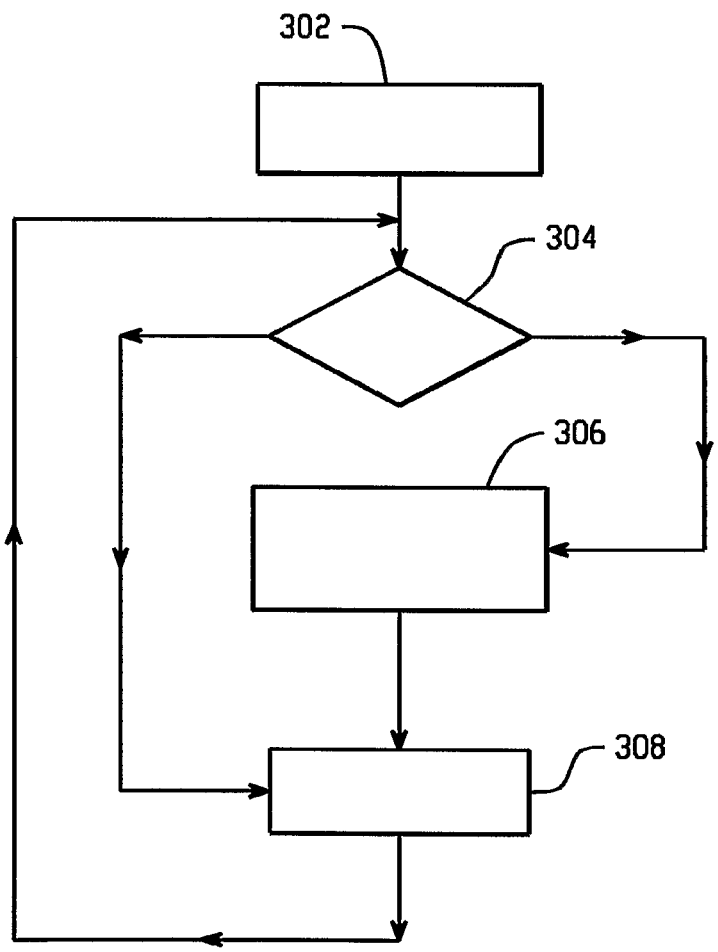
FIG. 5 is a flow chart illustration of the use of a cache memory resource in a reconstruction process.

However, system efficiencies generally limit cache memory sizes to a fraction of the size of the conventional memory resource, wherein a typical cache is too small to contain an entire LUT. Accordingly, in one aspect a LUT may be organized and accessed through use of a cache 150 to reduce overall reconstruction times. For example, FIG. 5 provides a flow chart illustration of the use of a cache memory resource 150 in a reconstruction process by processor 130 for an image matrix grid organized in z-row word lines containing 32-bytes, eight 4-byte words each, wherein each word line contains one-word matrix elements having the same transverse (x axis 114 and y axis 112) indices but different z axis 110 indices; and wherein the z-row word lines are further organized with respect to each other by ascending or descending axial index integer k values, z-row word lines having adjacent z axis 110 values thereby stored next to each other in the LUT. In one aspect this z-axis 110 order LUT organization is maintained in loading the LUT into the processor 130 memory 140, and the reconstructor 129 is configured to process the LUT in a corresponding z-axis 110-integer k order.

It is to be understood that although some embodiments described herein utilize data word and data word line configurations for reconstruction elements (such as, for example, but not exclusively, LUT's, LOR's and image matrix elements), other data sizes and data group sizes may be practiced.

FIG. 5 provides an example of one aspect of cache management utilizing LUT ordering. At 302 the processor 130 fetches a data word associated with an LOR from the LUT to execute a reconstruction instruction by first looking for the word in the cache 150 at 304. If the requested word is in the cache 150 the processor 130 retrieves and processes the word. If however the word is not in the cache 150, at 306 an entire 32-byte word line containing the 4-byte word is retrieved from memory 140 to cache 150. The next matrix element word is then fetched for processing by the processor 130 at 308 through cache access by the same steps. Accordingly, it is preferred that the processing of LUT data has the same order as the order of LUT storage in the memory 140: if only the first word fetched in a z-row word line is a cache miss, then the remaining seven words now in the cache 150 will be sequentially processed, resulting in a cache hit for each of the remaining seven z-row line words until the line is exhausted, thereby maximizing the use of the cache word-line data before it is aged-out or otherwise replaced by other LUT data.

In another aspect the sequential order of the z-row word lines in the LUT and memory may provide additional cache management advantages. For example, a cache manager 152 may be configured so that when the last word in a line has been accessed the next z-row word line (as indicated by the processing order configuration) is pre-fetched into cache 150 in anticipation that it contains the next matrix element 220 to be requested by the processor 130. In this fashion subsequent cache misses may be reduced or avoided. Other pre-fetch techniques enabled by sequential ordering of the matrix elements and/or LOR's in the LUT and system memory in correlation with a sequential processing order of the matrix elements and/or LOR's will be apparent to one skilled in the art of cache management.

Another technique for speeding up processing times through efficient memory usage is using data already loaded into memory as many times as possible; where the memory is a cache, this may be utilized to ensure that data loaded into the cache is utilized multiple times before it is aged out, thereby reducing overall cache misses. Accordingly, in one aspect the system matrix LUT data and image matrix element data are ordered to provide that both image matrix data and LUT data associated with the image matrix data may reside in memory through multiple reconstruction ray-tracing operations before the data is replaced by a subsequent data call; or in the case of a cache memory, before the data is aged out through cache management techniques. More particularly, in one aspect a hybrid iterative loop process is provided having a processing order corresponding to an order of retrieval of image matrix elements and LUT data into a memory resource.

One typical prior art iterative reconstruction technique is a ray-driven technique, wherein an initial image estimate update in projection space for a given LOR $M_{projection}$ is derived through the following Equation 6:

$$M_{projection} = \Sigma_q I_q * S_l; \qquad \text{Equation 6}$$

wherein $I_q$ is an image matrix element value within grid 250 at q=(k, j, i); and $S_l$ is a non-zero system matrix element from the LUT associated with the LOR and described by l=(R δ, Φ, z), wherein δ is the ring difference of two connecting detector crystals 107, R is the radial bin, and z is the LOR's axial coordinate. In this technique a LOR 202 is selected and a projection performed with respect to all non-zero system matrix elements, then a next LOR is selected and the process described by Equation 6 is repeated until all LOR's have been projected. In applying Equation 6 it is generally required to retrieve a new image matrix element and/or a new non-zero system matrix element into memory after each incrementation of the q indices, thus adding memory fetching process steps and times to each LOR update.

Another typical prior art iterative reconstruction technique is an image element-driven technique. For example, an initial image estimate correction in projection space for a given blob 240 (or other image matrix basis element) $C_{correction}$ is derived through the following Equation 7:

$$C_{correction} = \Sigma_l I_q * S_l; \qquad \text{Equation 7}$$

wherein each blob (or other image basis element) 240 is selected and corrected with respect to all LOR's 202 having a non-zero geometric factor, then a next blob 240 is selected and the process repeated. As with the ray-driven technique, in applying Equation 7 it is generally required to retrieve a new image matrix element and/or a new non-zero system matrix element into memory after each incrementation of the l indices, thus adding memory fetching process steps and times to each blob correction.

In one aspect a hybrid iterative reconstruction process is provided, wherein an initial image estimate update in projection space for a given LOR $M_{projection}$ may be derived through the following Equation 8:

$$M_{projection} = \Sigma_l \Sigma_q I_q * S_{ql};\qquad \text{Equation 8}$$

Figure 6:
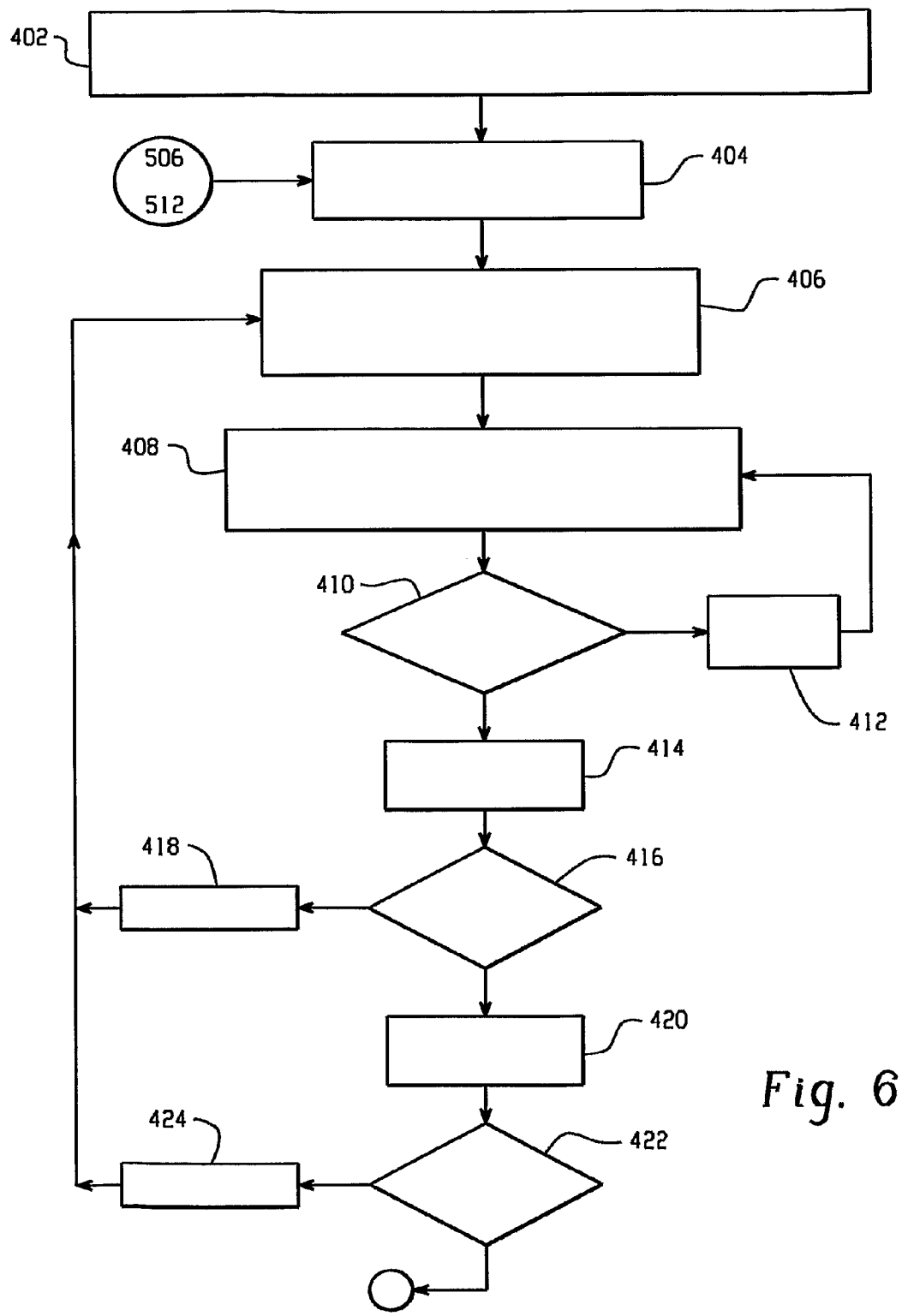
FIG. 6 is another flow chart illustration of the use of a cache memory resource in a reconstruction process.

More particularly, referring now to FIG. 6, the hybrid iteration process described generally by Equation 8 loops on multiple indices following the order [($k_b$, z), $j_b$, $i_b$, R, δ] with δ being the outmost loop index and $k_b$ the innermost loop index, wherein beginning with an innermost loop of index $k_b$ the image matrix grid elements 240 intersecting an indicated azimuthal angle value are selected by incrementing the z and $k_b$ indexes together, the iterative process looping sequentially through all azimuthal angle values. Thus at 402 an initial lowest image matrix element integer value ($k_b$, $j_b$, $i_b$) and an associated LOR azimuthal angle value (z, R, δ), is selected, wherein ($k_b$=z). At 404 non-zero system matrix LOR data associated with (z, R, δ) is fetched from the LUT into memory. In one aspect the memory is the cache 150, however, in other embodiments larger or otherwise different memory resources may be utilized. At 406 a set of image elements having common ($j_b$, $i_b$) but divergent $k_b$ values is fetched into memory. At 408 the image element having index ($k_b$, $j_b$, $i_b$), already in memory, is selected and traced with the non-zero LOR data already fetched into memory. Then, until it is determined that the final z and $k_b$ values have been reached at 410, z is incremented in synchronization with the image matrix element axial index $k_b$ at 412, and the next image element ($k_b$, $j_b$, $i_b$), already in memory, is selected and traced with the non-zero LOR data already fetched into memory.

Then, after the innermost z and $k_b$ index loop is completed, the remaining matrix index values are looped. First, in a second loop after the final z and $k_b$ index values reached at 410, they are reset to their initial values at 414, and it is determined whether $j_b$ is at its final index value at 416; if not, then $j_b$ is incremented at 418 and another set of image elements having common ($j_b$, $i_b$) but divergent $k_b$ values is fetched into memory at 406, and each of the set of image elements is traced with the LOR data in memory through the innermost loop steps 408, 410 and 412 described above until the maximum z and k index values are again reached at 410. Then when the $j_b$ index determined at final value at 416, it is reset to its initial value at 420 and the next matrix index $i_b$ is incremented at 424 and the above steps repeated in a third loop until the final $i_b$ value is reached at 422.

Figure 7:
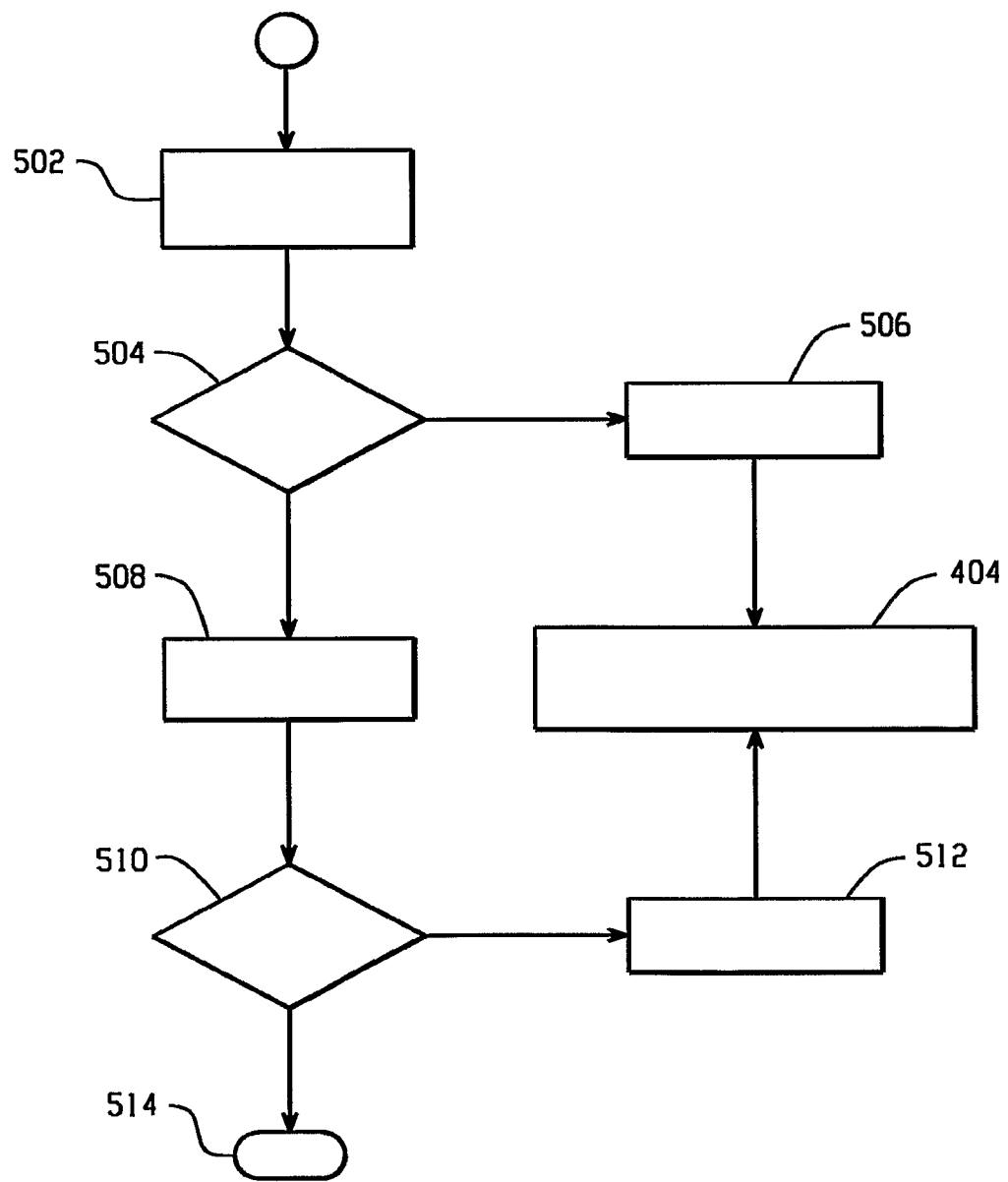
FIG. 7 is another flow chart illustration of the use of a cache memory resource in a reconstruction process.

Referring now to FIG. 7, when the final $i_b$ value is reached at 422 of FIG. 6, R and δ values are incremented through subsequent loops. More particularly, in a fourth loop $i_b$ is reset to its initial value at 502, and it is determined whether R is at its final index value at 504; if not, then R is incremented at 506 and the LOR data associated with (z, R, δ) is fetched from the LUT into memory at 406, and above-described steps repeated thereafter. Then, when the R, index is determined at final value at 504, R is reset to its initial value at 508 and index δ is incremented at 512, and the LOR data associated with (z, R, δ) is fetched from the LUT into memory at 406 and the above-described steps repeated thereafter. When the final δ value is determined to be reached at 510, the iterative process ends at 514, thus completing an image estimate update iteration.

Therefore, in one aspect both LUT and image matrix data are fetched into memory and used multiple times in the iterative reconstruction process before being replaced by other LUT or image matrix data, thus providing a reduced number of memory retrieval steps compared to ray-driven or image element-driven techniques. As will be readily apparent to one skilled in the art, by maximizing the use of data already in memory or cache memory, and correspondingly reducing the number of memory or cache fetch operations, overall ray-tracing times may be reduced compared to ray-driven or image element-driven techniques, thereby reducing overall reconstruction times.

In one aspect an alternative data ordering is provided corresponding to an anticipated data processing order. Accordingly, in one example image grid 250 matrix elements 240 are stored in memory, and retrieved for processing, in a ($k_b$, $j_b$, $i_b$) ordering, wherein the first stored element 240 has an initial lowest ($k_b$, $j_b$, $i_b$) value, the next stored image element 240 has the value [($k_b$+1), $j_b$, $i_b$], and subsequent image elements are stored in an order following an incrementation of first the $k_b$ index, then the $j_b$ index, and lastly the $i_b$ index. This is an opposite ordering relative to common prior art techniques for image matrix element ordering in memory, wherein typically the last $i_b$ index is chosen for incrementation and data ordering accordingly. Thus is one aspect the ($k_i$, $j_b$, $i_b$) ordering of the image matrix elements in memory will enable more rapid retrieval of the image matrix elements by enabling a set of elements located in adjacent memory cells to be retrieved at once into a memory or cache memory: for example, the image elements may define word lines ordered with respect to an incrementation of the $k_b$ within the ($k_b$, $j_b$, $i_b$) ordering, and thus calling an entire word line into a cache 150 upon a first image element miss, as described above. As the rest of the word line will produce cache hits where the processing order correlates to the order of image elements data in the word line, cache misses and memory fetch operations are reduced.

Similarly, it is also preferred to order and retrieve the LUT data according to the order of processing: thus in one example the LUT is ordered in a (z, R, δ) ordering, wherein first stored LUT data has an initial lowest (z, R, δ) value, the next stored LUT data has the value [(z+1), R, δ], and subsequent LUT data is stored in an order following an incrementation of first the z index, then the R index, and lastly the δ index.

Alternative examples may utilize other initial values and final values and index methods, such as an initial highest value with successive steps decrementing an index to a final lowest value; or a specified initial reference value with successive steps decrementing or incrementing an index to a final value. Thus the specific initial and ending values are not important.

In another aspect, by utilizing LOR data symmetry discussed above wherein LOR data is ordered with respect to geometric factor symmetry, one LOR data element associated with one index (z, R, δ) may be loaded from the LUT and used to update each of a set of image elements (those having common ($j_b$, $i_b$) but divergent $k_b$ values); thus symmetry may be used to reducing the size of the LUT and to provide an order of data within the LUT that will provide for efficient data retrieval into memory and/or cache. More particularly, if memory or cache memory resources are large enough, more than one system element may be retrieved from the LUT. If the data is ordered in the LUT correlating to the reconstruction processing order, then memory or cache misses will be reduced when the next LUT system matrix element required is already in the memory or cache.

In another aspect the above-described techniques for data ordering and/or cache management may be adapted to list-mode reconstruction techniques. More particularly, list mode data may be grouped in memory in an order corresponding to the iterative reconstruction processing of the list mode data: in one example, parallel annihilation events are grouped together.

In another aspect the above-described techniques for data ordering and/or cache management may be adapted to sensitivity matrix calculation techniques. More particularly, memory access patterns may be ordered according to symmetrical relationships. One sensitivity matrix calculation technique appropriate for use through the data ordering and/or cache management techniques described above is taught in "Propagation of Errors From the Sensitivity Image in List Mode Reconstruction," Jinyi Qi and Ronald H. Huesman, IEEE Transactions on Medical Imaging, VOL. 23, NO. 9, September 2004.

In another aspect, the image grid 250 may be configured with an even number of matrix elements: accordingly each iteration of the loop process described above may be described as processing a number of pairs of matrix elements. As the iteration update of each matrix element is independent of the iteration update of the other matrix element in any given pair, two processor's 130 may be used in a parallel processing configuration to perform the iteration update, thereby enabling reconstructor 129 optimization and/or further reductions in processing times.

Embodiments of the inventions described above may be tangibly embodied in a computer program stored in suitable memory storage device 140 and made available to the system 100 and reconstructor 129. Exemplary machine-readable memory storage mediums 140 include, but are not limited to, fixed hard drives, optical discs, magnetic tapes, semiconductor memories, such as read-only memories (ROMs), programmable (PROMs), etc. The memory 140 containing the computer readable code is utilized by executing the code directly from the memory 140, or by copying the code from one memory storage device to another memory storage device, or by transmitting the code on a network for remote execution. The computer program may be loaded into the memory of a computer to configure a processor for execution of the techniques described above. The computer program comprises instructions which, when read and executed by a processor causes the processor to perform the steps necessary to execute the steps or elements of the present invention.

The invention has been described with reference to the preferred embodiments. Of course, modifications and alterations will occur to others upon reading and understanding the preceding description. For example, although LUT's have been described herein with respect to system matrix elements, LUT's may comprise an array or matrix of other data that contains items that are searched, and it is not intended that the term LUT be construed as limited to the specific embodiments described herein. It is intended that the invention be construed as including all such modifications and alterations insofar as they come within the scope of the appended claims.

What is claimed is:

1. A method for processing data associated with a nuclear medical imaging technique, comprising the steps of:
ordering, with a computer processor, a plurality of data elements into a plurality of ordered data groups according to a spatial index order, wherein each of the plurality of ordered data groups has a plurality of data elements each with common first and second index values and a divergent third index value and the plurality of data elements are list mode events;
fetching an ordered data group of the plurality of ordered data groups into a memory device; and
processing each data element of the ordered data group from the memory device in the spatial index order, wherein the processing is part of a list mode based reconstruction.

2. The method of claim 1, wherein the data elements are sensitivity matrix elements; and
wherein the step of ordering the plurality of data elements comprises ordering the sensitivity matrix elements in a symmetrical memory access pattern.

3. The method of claim 1, wherein the method for processing data associated with a nuclear medical imaging technique is a method for reconstruction of PET data into a volumetric image, and wherein the step of processing each data element of the ordered data group comprises generating an image estimate update.

4. The method of claim 3, wherein the method for reconstruction of PET data is a list mode technique; and
wherein the step of ordering the plurality of data elements into a plurality of ordered data groups comprises grouping parallel annihilation events together into each of the plurality of ordered data groups in an order corresponding to an iterative reconstruction processing order of list mode data.

5. The method of claim 3, wherein the step of ordering the plurality of ordered data groups comprises using a geometric symmetry of a PET scanner FOV.

6. The method of claim 3, wherein the step of ordering the plurality of ordered data groups comprises ordering according to an axial spacing dimension of PET scanner detector crystals.

7. The method of claim 3, further comprising the step of fetching a system matrix element from an ordered LUT into the memory device, the ordered LUT comprising a plurality of system matrix elements ordered in correlation to the spatial index order;
wherein the data elements are each ordered image matrix elements; and
wherein the step of generating an image estimate update comprises using the system matrix element to update each of the image matrix elements.

8. The method of claim 7, wherein the system matrix element has the common first and second index values, and wherein the step of generating an image estimate update comprises using the system matrix element to update each image matrix element having the common first and second index values and any third index value.

9. The method of claim 8 wherein the LUT comprises a total number of system matrix elements, the total number of system matrix elements equal to a total number of image matrix elements divided by a total number of possible third index values.

10. The method of claim 8 wherein the memory device is a cache, and the step of fetching the ordered data group into a memory device comprises fetching the ordered data group from a system memory resource;
wherein the order of the plurality of image matrix elements in the ordered data group is an ascending or descending axial index order; and
wherein the processing order comprises selecting and updating each of the image matrix elements with the system matrix element in the ascending or descending axial index order.

11. The method of claim 10, wherein the step of generating an image estimate update by processing each data element of the ordered data group from the memory device in a processing order comprises:

looping on system matrix element indices and image matrix element indices, wherein beginning with an innermost loop of an image element axial index, image matrix elements intersecting an indicated LOR azimuthal angle value are selected by incrementing a system matrix LOR axial index together with an image matrix element axial index.

12. The method of claim 11, further comprising the steps of:

indexing a second LOR index;
    fetching a second system matrix element from the LUT having the indexed second LOR index into the cache;
    fetching a second ordered image matrix group into the cache, the second image matrix group chosen in correlation with the indexed second LOR index; and
    updating each of the second ordered image matrix group image matrix elements with the second system matrix element.

* * * * *